E

(12) United States Patent
Sun et al.

(10) Patent No.: US 11,063,466 B2
(45) Date of Patent: Jul. 13, 2021

(54) POWER SUPPLY APPARATUS HAVING POWER SAVING FUNCTION AND AIR CONDITIONER INCLUDING THE SAME

(71) Applicant: LG ELECTRONICS INC., Seoul (KR)

(72) Inventors: Hodong Sun, Seoul (KR); Youngjin Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 15/919,531

(22) Filed: Mar. 13, 2018

(65) Prior Publication Data
US 2018/0366975 A1 Dec. 20, 2018

(30) Foreign Application Priority Data
Jun. 20, 2017 (KR) .......................... 10-2017-0078008

(51) Int. Cl.
*H02J 9/00* (2006.01)
*F24F 1/20* (2011.01)
(Continued)

(52) U.S. Cl.
CPC ............... *H02J 9/005* (2013.01); *F24F 1/20* (2013.01); *F24F 11/46* (2018.01); *F24F 11/50* (2018.01);
(Continued)

(58) Field of Classification Search
CPC .. H02J 9/005; F24F 11/65; F24F 11/88; F24F 11/46; F24F 11/50; F24F 1/20; H02P 27/06
See application file for complete search history.

(56) References Cited

U.S. PATENT DOCUMENTS 5,179,842 A * 1/1993 Kanazawa ............ F25B 49/025
318/778
9,058,169 B2 * 6/2015 Chen ...................... H04M 1/738
(Continued)

FOREIGN PATENT DOCUMENTS

JP 2005257239 A * 9/2005
JP 2005-278370 10/2005
(Continued)

OTHER PUBLICATIONS

Korean Notice of Allowance dated Apr. 15, 2019 issued in Application No. 10-2017-7032077 (with English Translation).
(Continued)

*Primary Examiner* — Pinping Sun
(74) *Attorney, Agent, or Firm* — KED & Associates LLP (57) ABSTRACT

A power supply apparatus (such as an air conditioner) may have a power saving function. A first power supply unit may be connected to an AC power supply and a first communication unit may be connected to the first power supply unit and to a communication line. A connector may be connected to the first communication unit and the communication line. A first controller may be connected to the first communication unit and the connector. A second communication unit may have one side connected to the communication line and the other side connected to the AC power supply. A second power supply unit may be connected to the AC power supply. A wakeup voltage generator may be connected to the communication line and the second power supply unit to generate a voltage. A second controller may be connected to the second communication unit and the wakeup voltage generator.

17 Claims, 7 Drawing Sheets

(51) Int. Cl.
*F24F 11/50* (2018.01)
*F24F 11/46* (2018.01)
*F24F 11/88* (2018.01)
*F24F 11/65* (2018.01)
*H02P 27/06* (2006.01)

(52) U.S. Cl.
CPC .............. *F24F 11/65* (2018.01); *F24F 11/88* (2018.01); *H02P 27/06* (2013.01)

(56) References Cited

U.S. PATENT DOCUMENTS

| | | | | |
|---|---|---|---|---|
| 9,470,444 | B1* | 10/2016 | Takata | F25B 49/02 |
| 10,230,303 | B2* | 3/2019 | Malinin | H02M 3/33507 |
| 2008/0092570 | A1* | 4/2008 | Choi | F24F 11/30 |
| | | | | 62/157 |
| 2010/0329363 | A1* | 12/2010 | Ng | H04L 12/12 |
| | | | | 375/257 |
| 2012/0262950 | A1* | 10/2012 | Nate | H02J 9/005 |
| | | | | 363/16 |
| 2013/0067941 | A1* | 3/2013 | Lee | F24F 11/49 |
| | | | | 62/126 |
| 2015/0001962 | A1* | 1/2015 | Higashiyama | F24F 11/62 |
| | | | | 307/113 |
| 2016/0273792 | A1* | 9/2016 | Xi | F24F 11/00 |
| 2018/0283720 | A1* | 10/2018 | Lee | H02M 3/33561 |
| 2019/0116480 | A1* | 4/2019 | Schultz | H04W 24/08 |

FOREIGN PATENT DOCUMENTS

| | | |
|---|---|---|
| JP | 2017-055481 | 3/2017 |
| KR | 10-2008-0035173 | 4/2008 |
| KR | 10-2011-0138670 | 12/2011 |
| KR | 20110138670 A * | 12/2011 |

OTHER PUBLICATIONS

Korean Office Action dated Jan. 22, 2019 issued in Application 10-2017-0078008 (full Korean text).

* cited by examiner

POWER SUPPLY APPARATUS HAVING POWER SAVING FUNCTION AND AIR CONDITIONER INCLUDING THE SAME

CROSS-REFERENCE TO RELATED APPLICATION

This application claims priority under 35 U.S.C. § 119 to Korean Application No. 10-2017-0078008, filed Jun. 20, 2017, whose entire disclosure is hereby incorporated by reference.

BACKGROUND

1. Field

The present disclosure relates to a power supply apparatus, and more particularly, to a power supply apparatus having a power saving function, and an air conditioner including the same.

2. Background

A compressor installed in an outdoor unit of an air conditioner may use a motor as a driving source. The motor may be provided with AC power from a power transformer.

A power transformer may include a rectifier, a power factor controller and an inverter, for example.

A commercial AC voltage output from a commercial power supply may be rectified by the rectifier. This voltage rectified by the rectifier may be supplied to the inverter. The inverter may generate AC power for driving a motor using the voltage output from the rectifier.

An air conditioner may include a controller (microcomputer) and a switched mode power supply (SMPS) that supplies power to components in addition to a power transformer.

The air conditioner may also include a communication unit for communication between an indoor unit and an outdoor unit, and thus the outdoor unit can be controlled according to operation control of the air conditioner performed in the indoor unit.

When a predetermined time elapses after operation of the air conditioner is stopped by the indoor unit or by a user using a remote controller, the outdoor unit of the air conditioner can enter a power saving state.

That is, some of power supplied to the outdoor unit can be blocked in the power saving state to reduce power consumption.

To reduce standby power, a circuit using a relay may be configured, or outdoor unit power may be cut off using an additional control line.

Accordingly, there is a need for a method of minimizing power consumption in a power saving state while minimizing the number of additional components and control lines.

BRIEF DESCRIPTION OF THE DRAWINGS

Arrangements and embodiments may be described in detail with reference to the following drawings in which like reference numerals refer to like elements and wherein.

DETAILED DESCRIPTION

Hereinafter, arrangements and embodiments may be described in detail with reference to the attached drawings.

While embodiments may be susceptible to various modifications and alternative forms, specific embodiments thereof are shown by way of example in the drawings and will herein be described in detail. It should be understood, however, that there is no intent to limit the embodiments to the particular forms disclosed, but on the contrary, embodiments are to cover all modifications, equivalents, and alternatives falling within the spirit and scope as defined by the claims.

It will be understood that when an element is referred to as being "on" another element, it can be directly on the other element or intervening elements may be present therebetween.

It will be understood that, although the terms first, second, third etc. may be used herein to describe various elements, components, regions, layers and/or sections, these elements, components, regions, layers and/or sections should not be limited by these terms.

Figure 1:
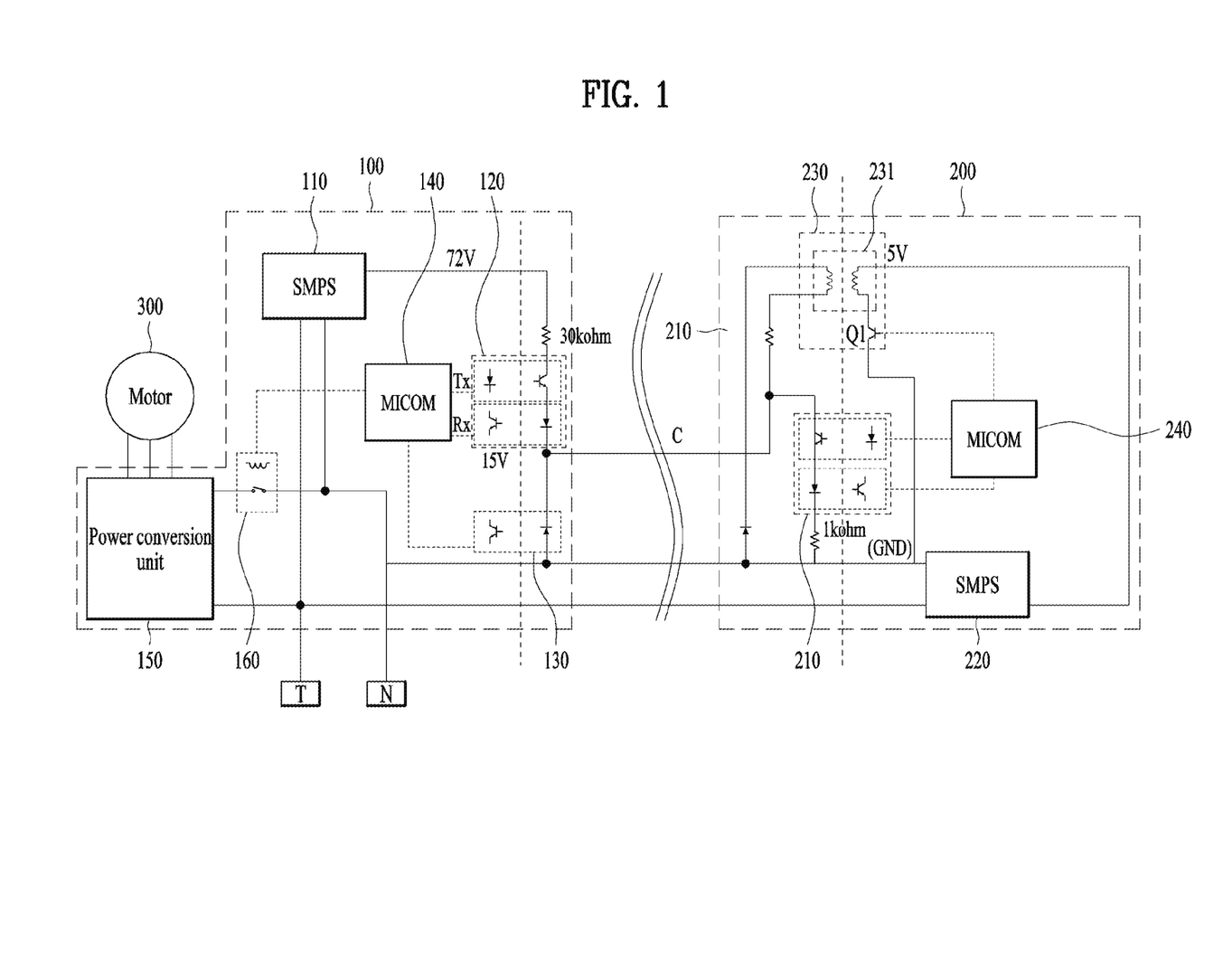
FIG. 1 is a circuit diagram showing a power supply apparatus according to an embodiment.

FIG. 1 is a circuit diagram showing a power supply apparatus according to an embodiment. Other embodiments and configurations may also be provided.

Referring to FIG. 1, the power supply apparatus may be divided into a first device (or outdoor unit 100) and a second device (or indoor unit 200) that can be connected to each other through a communication line C. The communication line may be one line, a plurality of lines, or other means, for example.

The first device (or outdoor unit 100) and the second device (or indoor unit 200) may respectively include a first communication unit 120 (or first communication device), and a second communication unit 210 (or second communication device), and communication between the first device and the second device may be performed through the first communication unit 120 and the second communication unit 210.

This communication process may be performed under control of a first controller 140 and a second controller 240.

The first device (or outdoor unit 100) may enter a power saving state through the communication process to reduce power consumption of the power supply apparatus.

The first device and the second device may be described as exemplary devices constituting an air conditioner. That is, the first device and the second device may correspond to an outdoor unit and an indoor unit of the air conditioner, respectively. However, embodiments are not limited thereto.

Referring to FIG. 1, the air conditioner may include the outdoor unit 100 installed outdoors and the indoor unit 200 installed indoors. The outdoor unit 100 and the indoor unit 200 may be connected (or coupled) to each other through the communication line C.

The outdoor unit 100 may include a first power supply unit (SMPS) 110 (or first power supply device) that is connected to an external AC power supply T/N and that supplies power to components of the outdoor unit 100, the first communication unit 120 (one side of which is connected to the first power supply unit 110 and the other side of which is connected to the communication line C), a connector 130 connected to the first communication unit 120 and the communication line C, and a first controller (MI-COM) 140 connected to the first communication unit 120 and the connector 130.

The first communication unit 120 may be provided with power from the first power supply unit 110. Additionally, the first communication unit 120 may transmit/receive a control signal to/from the first controller 140. A signal transmitted from the first controller 140 to the first communication unit 120 may be a transmission signal Tx, and a signal received by the first controller 140 from the first communication unit 120 may be a reception signal Rx.

One side of the first communication unit 120 may be connected (or coupled) to the first power supply unit 110 and the other side thereof may be connected (or coupled) to the communication line C.

As discussed above, one side of the connector 130 is connected to the first communication unit 120 and the communication line C, and the other side of the connector 130 is connected to a ground N (or ground line).

The connector 130 may be implemented as a photocoupler controlled by the first controller 140. That is, a transistor of the connector 130 may be connected to the first controller 140 and a photodiode thereof may be connected to the first communication unit 120 and the communication line C.

When the outdoor unit 100 enters a power saving state, the first power supply unit 110 may turn off a regulator (or similar type of device) included therein according to control of the first controller 140 so as to interrupt power supplied to components other than the first controller 140.

The indoor unit 200 may include the second communication unit 210 communicating with the first communication unit 120 (of the outdoor unit 100) through the communication line C, a second power supply unit 220 (or second power supply device) (coupled to the AC power supply T/N and that supplies power to the second communication unit 210 and components of the indoor unit 200), a wakeup voltage generator 230 (connected to the communication line C and the second power supply unit 210 and that generates a voltage), and a second controller 240 connected (or coupled) to the wakeup voltage generator 230 and that transmits a control signal (e.g., Tx) to the second communication unit 210. The second controller 240 may be provided with power from the second power supply unit 220 connected (or coupled) to the AC power supply T/N.

The outdoor unit 100 and the indoor unit 200 can be connected (coupled) to the AC power supply T/N and independently provided with power from the AC power supply T/N.

The second communication unit 210 may transmit/receive communication signals to/from the first communication unit 120 through the communication line C according to control of the second controller 240.

Similarly to the outdoor unit 100, a signal transmitted from the second controller 240 to the second communication unit 210 may be a transmission signal Tx, and a signal received by the second controller 240 (from the second communication unit 210) may be a reception signal Rx.

One side of the second communication unit 210 may be connected (or coupled) to the communication line C and the other side thereof may be connected (or coupled) to the AC power supply T/N. More specifically, the other side of the second communication unit 210 may be connected (or coupled) to the ground N (or ground line) through a 1 kΩ resistor, for example.

The wakeup voltage generator 230 may include a pulse transformer 231 connected (or coupled) to the second power supply unit 220 and a transistor Q1 connected (or coupled) to one side of the pulse transformer 231 and driven by the second controller 240. The transistor may also be a switching device.

A primary side of the pulse transformer 231 may be connected to the second power supply unit 220 and a secondary side of the pulse transformer 231 may be connected to the communication line C. More specifically, the primary side of the pulse transformer 231 is connected to the ground N through the second power supply unit 220 and the transistor Q1. The ground N may be commonly connected to the pulse transformer 231 and the second power supply unit 220.

Additionally, a base of the transistor Q1 is connected to the second controller 240, and when the second controller 240 applies a high signal to the base of the transistor Q1, the transistor Q1 is turned on and current flows through the second power supply unit 220. Accordingly, power is applied to the secondary side of the pulse transistor 231 and a signal can be transmitted (or provided) to the communication line C. This process may be described below in more detail.

As shown in FIG. 1, the secondary side of the pulse transformer 231 is connected to the communication line C and the ground N.

In this connection state (or coupling state), the second controller 240 may apply a pulse signal to the transistor Q1 (of the wakeup voltage generator 230) to transmit (or provide) a wakeup signal to the first controller 140 through the communication line C when the power saving state is released (i.e., another state is entered).

The signal output from the wakeup voltage generator 230 may be transmitted to the first controller 140 through the connector 130.

As described above, the communication line C may be connected (or coupled) to the pulse transformer 231 (of the wakeup voltage generator 230) while connecting the first communication unit 120 and the second communication unit 210. The communication line C connected to the wakeup voltage generator 230 may be connected to the ground N of the AC power supply through the secondary side of the pulse transformer 231.

Upon entering a power saving state, the first controller 140 may notify the second controller 240 of the event of entering the power saving state through the first communication unit 120, the communication line C and the second communication unit 210.

Upon entering the power saving state, the first controller 140 may interrupt power supplied to components other than the first controller 140 by turning off the regulator (or similar type of device) included in the first power supply unit 110.

The outdoor unit 100 may include a relay 160 that selectively connects a power conversion unit 150 (or power conversion device) for driving a motor 300 and the AC power supply T/N.

The relay 160 may be operated (or controlled) by the first controller 140. That is, the relay 160 can be connected (or coupled) to the power conversion unit 150 and thus the power conversion unit 150 operates to drive the motor 300 when the air conditioner normally operates. When the air conditioner enters the power saving state, the relay 160 is released and thus the power conversion unit 150 does not operate.

The first communication unit 120 and the second communication unit 210 may be composed of two photocouplers coupled in opposite directions. A photodiode may be positioned at a signal transmitting side Tx of the first controller 140 or the second controller 240, and a transistor may be positioned at an opposite side. However, embodiments are not limited thereto.

FIGS. 2 to 7 are circuit diagrams showing operations of the power supply apparatus according to an embodiment. Other embodiments and configurations may also be provided.

Figure 2:
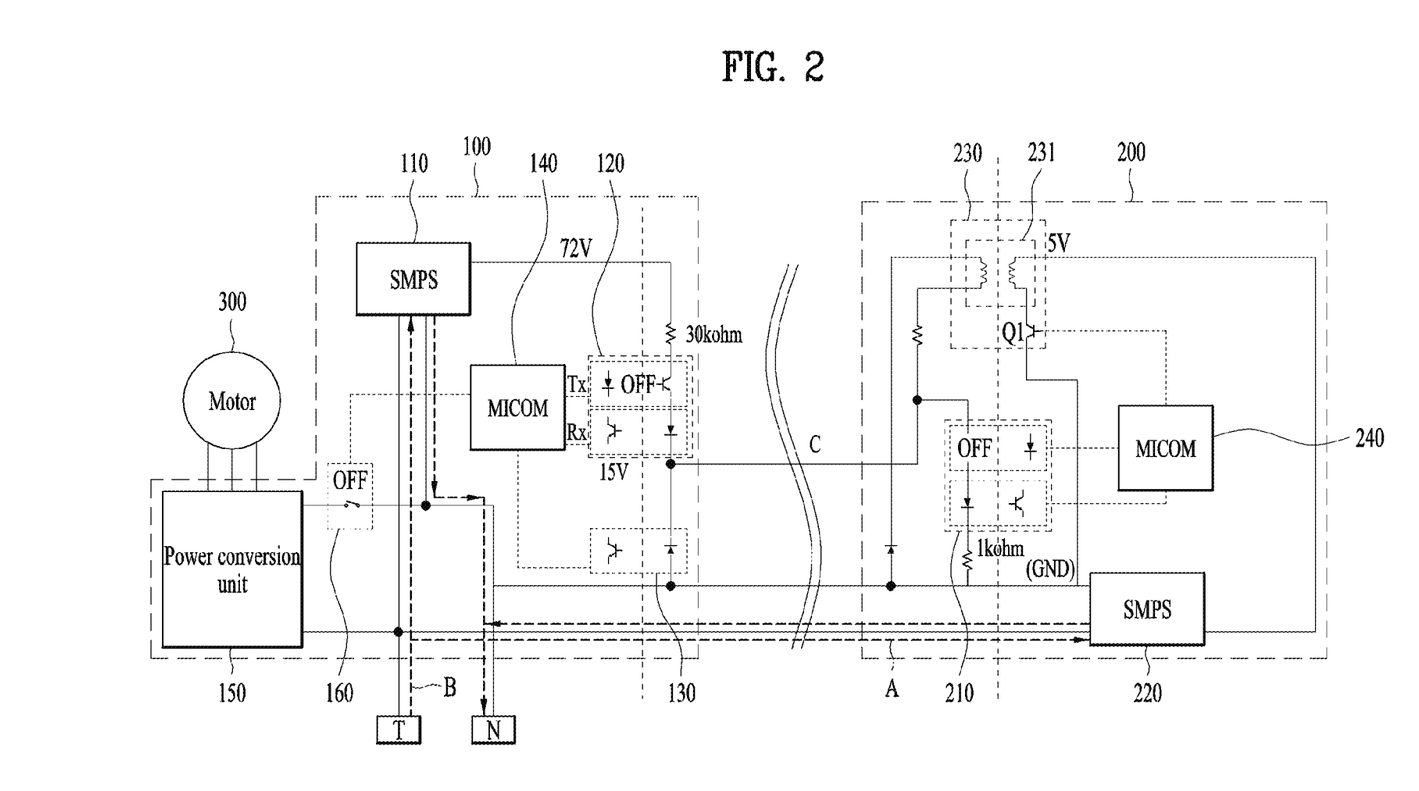
FIGS. 2 to 4 are circuit diagrams showing operation when a power saving state is converted to a normal operation state in the power supply apparatus according to an embodiment.
Figure 3:
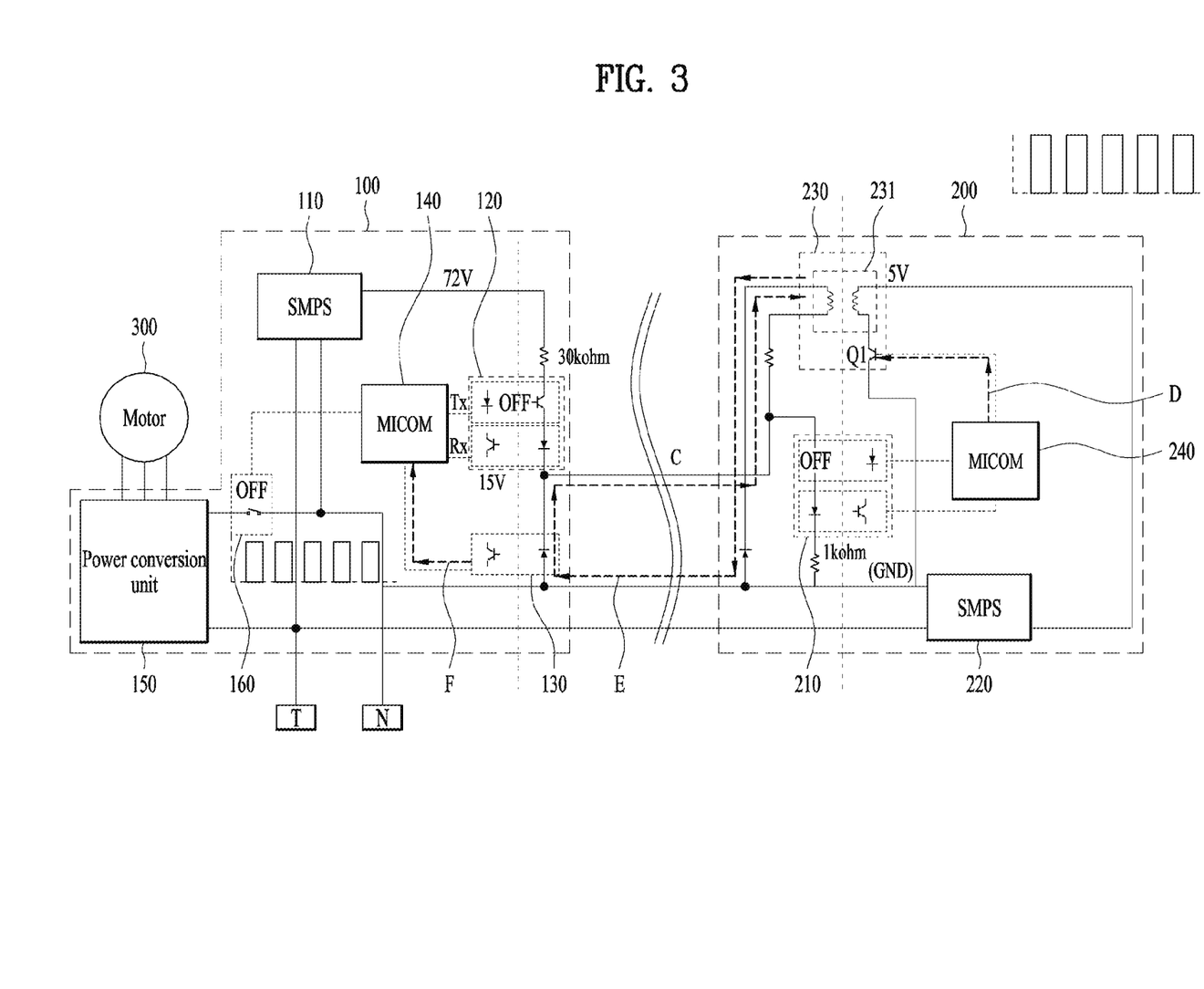
Figure 4:
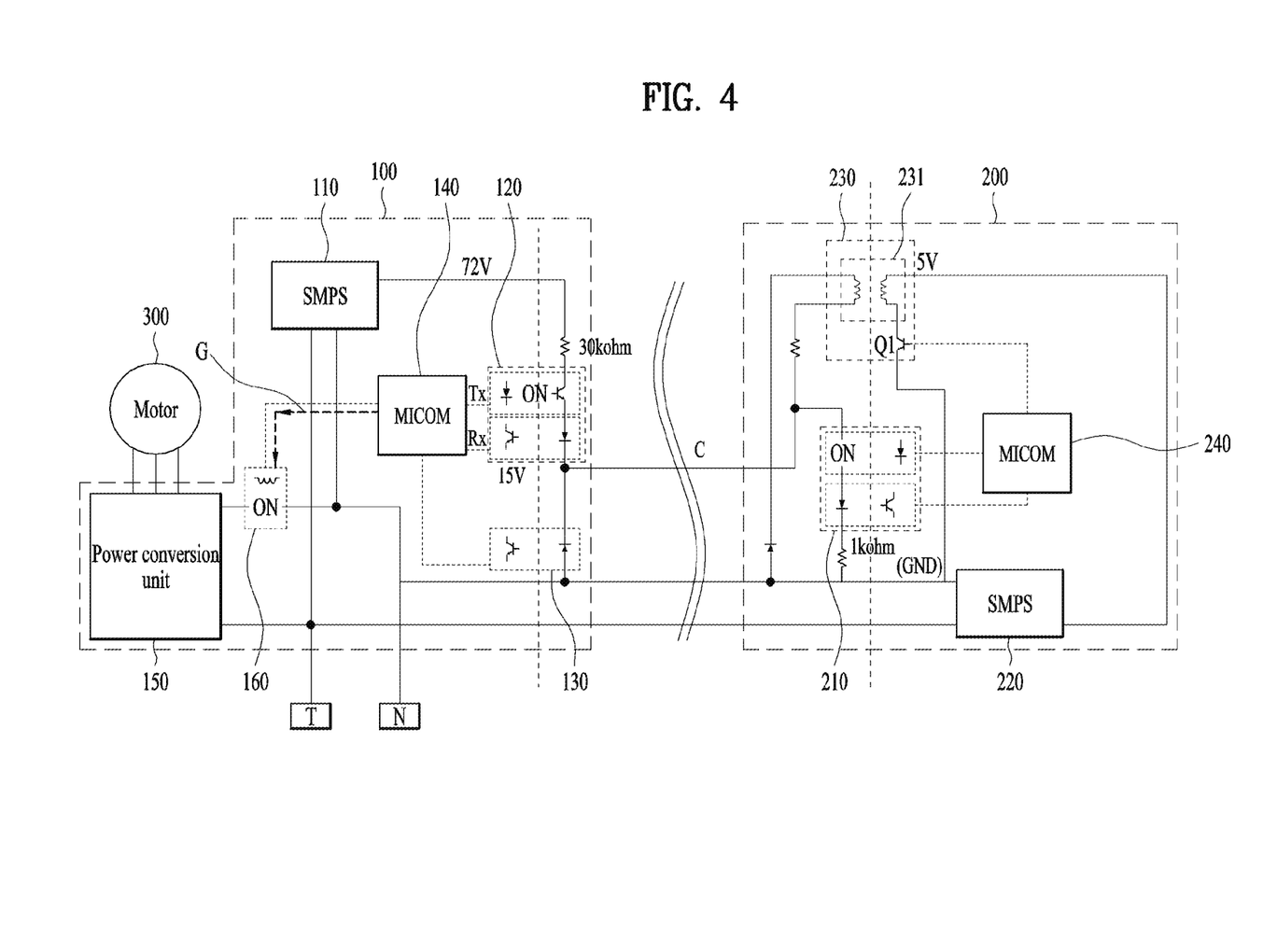

FIGS. 2 to 4 are circuit diagrams showing operation when a power saving state is converted to a normal operation state (in the power supply apparatus) according to an embodiment.

As described above, the first controller 140 may notify the second controller 240 of the event of entering the power saving state through the first communication unit 120, the communication line C and the second communication unit 210.

The first controller 140 may interrupt power supplied to components other than the first controller 140 by turning off the regulator (or similar type of device) included in the first power supply unit 110 upon entering the power saving state.

When a user starts operation of the air conditioner by turning on a switch or operating a remote controller, AC power is supplied from the AC power supply T/N to the second power supply unit 220 and thus the second power supply unit 220 (of the indoor unit 200) starts to operate, as represented by element A.

Accordingly, the second controller 240 of the indoor unit 200 may operate.

The AC power supply T/N may also be connected to the first power supply unit 110 (of the outdoor unit 100) to supply power to the first power supply unit 100, as represented by element B. In this example, power is also supplied to the first controller 140 and thus the first controller 140 wakes up in the power saving state. However, the regulator of the first power supply unit 110 has been turned off and thus other loads are not provided with power.

A process of supplying power to the outdoor unit 100 may be described with reference to FIG. 3.

When the second controller 240 (of the indoor unit 200) wakes up in the power saving state (or at the end of the power saving mode) and starts to operate, the second controller 240 (of the indoor unit 200) applies a pulse wave signal D to the wakeup voltage generator 230.

More specifically, the second controller 240 applies the pulse wave signal D to the transistor Q1 of the wakeup voltage generator 230.

When the pulse wave signal D is applied to the transistor Q1 (of the wakeup voltage generator 230), the pulse transformer 231 may be connected to the second power supply unit 220 when a high signal is applied to the base of the transistor Q1.

Then, a voltage may be induced to the secondary side of the pulse transformer 231 and thus current may flow through the secondary side of the pulse transformer 231, the ground N, the connector 130, the communication line C and the pulse transformer 231, as indicated by element E. That is, power may be applied to the communication line C through the pulse transformer 231 and transferred through the connector 130.

Accordingly, the pulse wave signal D may be delivered to the first controller 140 (of the outdoor unit 100) according to operation of the connector 130 (element F). Then, an operation of waking up components from the power saving state may be performed through the first controller 140.

The first controller 140, to which the pulse wave signal D has been applied, may operate the first power supply unit 110 and thus the regulator of the first power supply unit 110 may start to operate, for example. In this manner, the outdoor unit 100 may be provided with power through the first power supply unit 110 to start operation.

Then, the first controller 140 may control the relay 160 to be switched to an ON state (element G), as shown in FIG. 4. Accordingly, the power conversion unit 150 can be connected to the A/C power supply T/N and start to operate to drive the motor 300.

Figure 5:
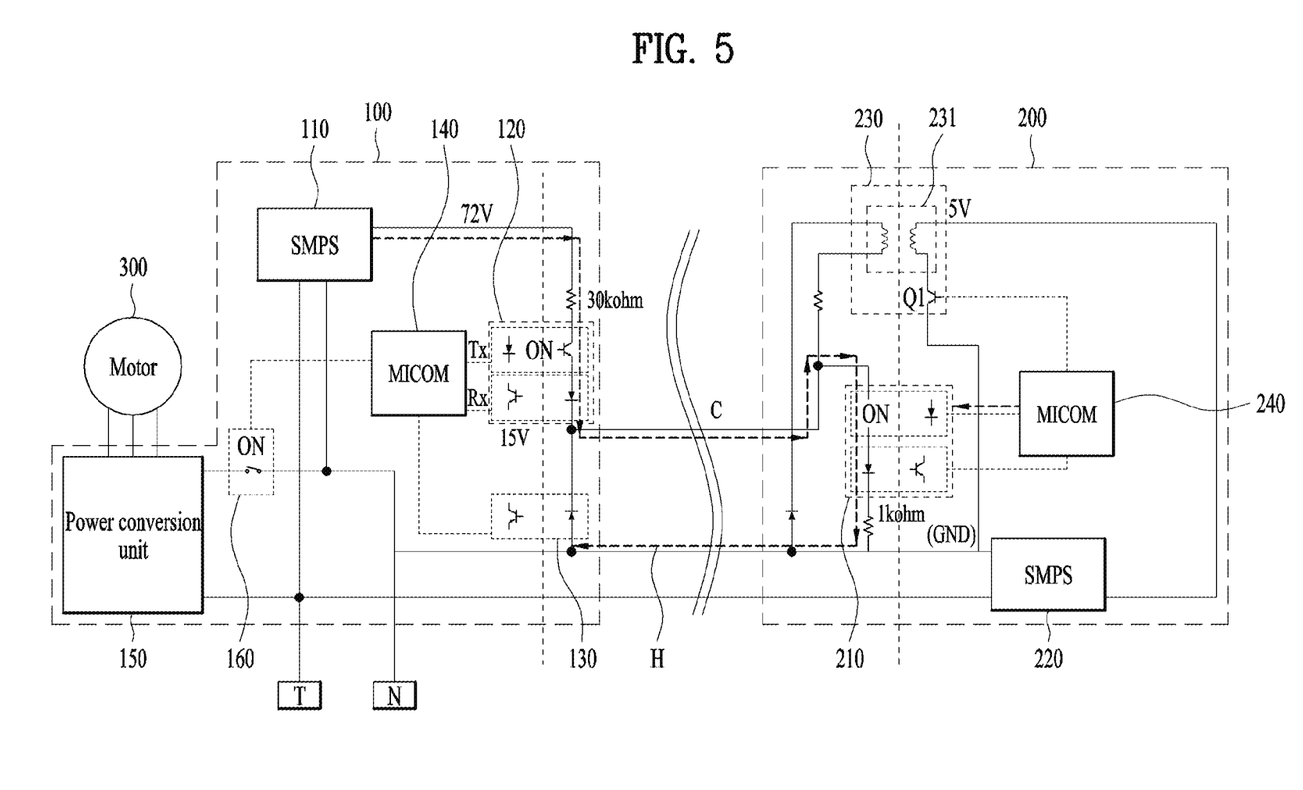
FIG. 5 is a circuit diagram showing a circuit operation in a normal operation state in the power supply apparatus according to an embodiment.

FIG. 5 shows a circuit operation in a normal operation state in the power supply apparatus according to an embodiment. Other embodiments and configurations may also be provided.

Referring to FIG. 5, the outdoor unit 100 may communicate with the indoor unit 200 through the communication line C. For example, in a state in which the first communication unit 120 and the second communication unit 210 are connected to each other through the communication line C and the first communication unit 120 is connected to the output 72V, for example, of the first power supply unit 110, communication can be performed according to control of the first controller 140 and the second controller 240.

Communication can be performed through a current flow indicated by element H. FIG. 5 shows a process in which a signal is transmitted from the outdoor unit 100 to the indoor unit 200. That is, a communication process can be performed in which the outdoor unit 100 is a master and the indoor unit 200 is a slave.

For example, the first controller 140 may transmit a signal to the first communication unit 120 such that the first communication unit 120 operates, and a signal may be transmitted from the first power supply unit 110 to the communication line C through the first communication unit 120.

Then, the signal may be delivered to the second communication unit 210 through the communication line C and the second communication unit 210 may transmit the signal to the second controller 240, as indicated by element G.

On the contrary, a signal may be transmitted from the indoor unit 200 to the outdoor unit 100, and the process of transmitting a signal from the outdoor unit 100 to the indoor unit 200 and the process of transmitting a signal from the indoor unit 200 to the outdoor unit 100 may be alternately performed.

Figure 6:
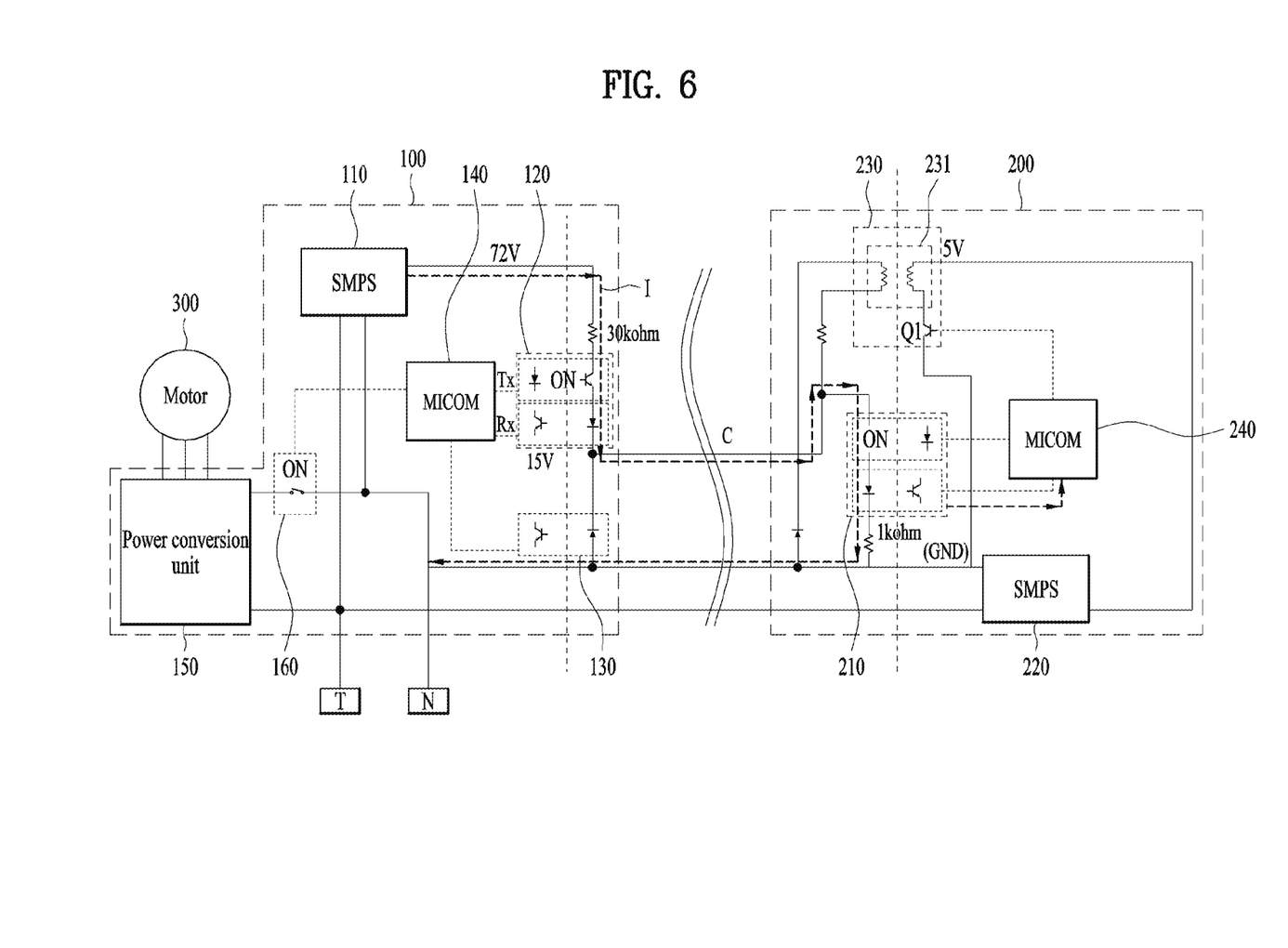
FIGS. 6 and 7 are circuit diagrams showing an operation when the power supply apparatus according to an embodiment is switched to a power saving state.
Figure 7:
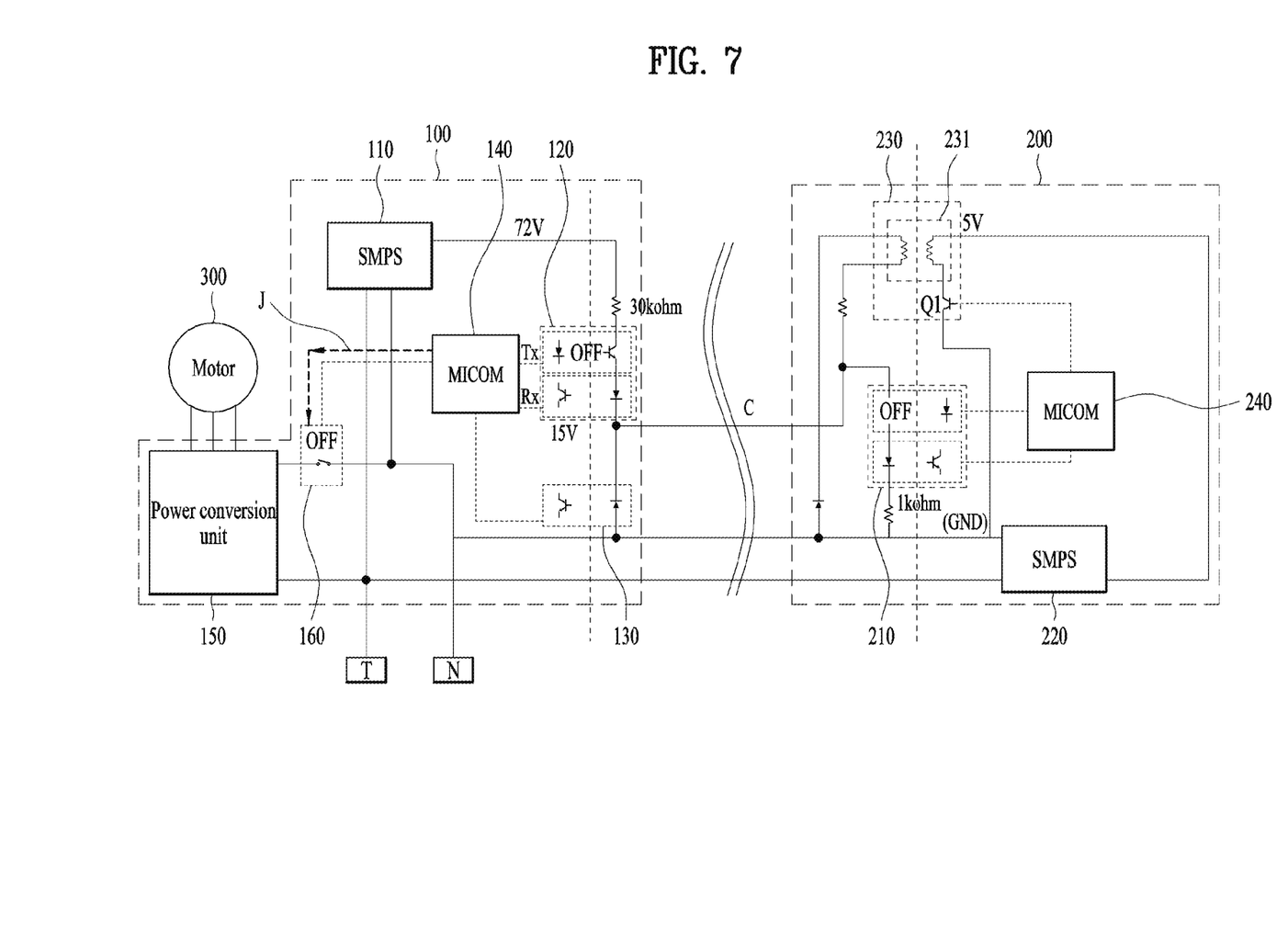

FIGS. 6 and 7 show an operation when the power supply apparatus according to an embodiment is switched to a power saving state. Other embodiments and configurations may also be provided.

Referring to FIG. 6, when the power supply apparatus is switched to a power saving state, for example, and the user stops operation of the air conditioner or when a predetermined time elapses after the operation of the air conditioner is stopped, the first controller 140 (of the outdoor unit 100) may notify the second controller 240 of switching to the power saving state.

For example, the first controller 140 may transmit a signal to the first communication unit 120 such that the first communication unit 120 operates and a signal may be transmitted from the first power supply unit 110 to the communication line C through the first communication unit 120 as in the above-described communication operation in the normal operation state.

The signal may be transmitted to the second communication unit 210 through the communication line C and may then be delivered from the second communication unit 210 to the second controller 240.

Through this process (represented by element I), the outdoor unit 100 can notify the indoor unit 200 of entering the power saving state.

Thereafter, the first controller 140 (of the outdoor unit 100) may control the relay 160 to stop the operation of the power conversion unit 150 (element J), as shown in FIG. 7.

Subsequently, the first controller 140 may turn off the regulator of the first power supply unit 110.

Power consumption in the power saving state can be minimized using the above-described power saving function.

Additionally, an operation of releasing the power saving state can be performed through the wakeup voltage generator 230 and the connector 130, and the power saving function can be realized at low cost using the pulse transformer 231 of the wakeup voltage generator 230 and the photocouplers constituting the connector 130.

The power saving function can be efficiently realized using a small number of components.

An object of the present disclosure may be to provide a power supply apparatus having a power saving function, which can reduce power consumption in a power saving state, and an air conditioner including the same.

Additionally, an object of the present disclosure may be to provide a power supply apparatus capable of reducing standby power using an additional circuit that supplies power to a communication line in an indoor unit, and an air conditioner including the same.

An object of the present disclosure may be to provide a power supply apparatus capable of efficiently realizing a power saving function using a small number of components and an air conditioner including the same.

In a first aspect to accomplish the objects, a power supply apparatus may include: a first power supply unit connected to an AC power supply; a first communication unit, one side of which is connected to the first power supply unit and the other side of which is connected to a communication line; a connector connected to the first communication unit and the communication line; a first controller connected to the first communication unit and the connector; a second communication unit, one side of which is connected to the communication line and the other side of which is connected to the AC power supply; a second power supply unit connected to the AC power supply; a wakeup voltage generator connected to the communication line and the second power supply unit to generate a voltage; and a second controller connected to the second communication unit and the wakeup voltage generator. Accordingly, power consumption in a power saving state can be minimized in the power supply apparatus divided into two parts having a communication line interposed therebetween. Additionally, one side of the power supply apparatus can control the other side when the power saving state is released.

Additionally, the wakeup voltage generator may transmit a pulse wave signal to the first controller through the communication line when a power saving state is released.

The second controller may apply a pulse signal to the wakeup voltage generator to control the wakeup voltage generator to generate a pulse wave release signal when a power saving state is released.

The wakeup voltage generator may include: a pulse transformer connected to the second power supply unit to generate a pulse signal; and a transistor connected to one side of the pulse transformer and driven by the second controller. Accordingly, the power saving function can be efficiently realized using a small number of components.

A primary side of the pulse transformer may be connected to the second power supply unit and a secondary side of the pulse transformer may be connected to the communication line.

The transistor may be connected between the primary side of the pulse transformer and a ground side of the second power supply unit.

A signal output from the wakeup voltage generator may be delivered to the first controller through the connector.

The power supply apparatus may further include a relay for selectively connecting a power conversion unit for driving a motor and the AC power supply.

In a second aspect for accomplishing the objects, an air conditioner may include an indoor unit and an outdoor unit connected to each other through a communication line, wherein the outdoor unit includes: a first power supply unit connected to an AC power supply; a first communication unit, one side of which is connected to the first power supply unit and the other side of which is connected to a communication line; a connector connected to the first communication unit and the communication line; and a first controller connected to the first communication unit and the connector, and the indoor unit includes: a second communication unit, one side of which is connected to the communication line and the other side of which is connected to the AC power supply; a second power supply unit connected to the AC power supply; a wakeup voltage generator connected to the communication line and the second power supply unit to generate a voltage; and a second controller connected to the second communication unit and the wakeup voltage generator. Accordingly, power consumption in a power saving state can be minimized in the air conditioner including the outdoor unit and the indoor unit.

In a third aspect for accomplishing the objects, an air conditioner may include an indoor unit and an outdoor unit connected to each other through a communication line, wherein the indoor unit includes: a communication unit, one side of which is connected to the communication line and the other side of which is connected to an AC power supply; a power supply unit connected to the AC power supply; a wakeup voltage generator connected to the communication line and the power supply unit to generate a voltage; and an indoor unit controller connected to the communication unit and the wakeup voltage generator, wherein the indoor unit controller applies a signal to the wakeup voltage generator to transmit a pulse wave release signal to the outdoor unit through the communication line when a power saving state is released. Accordingly, a power saving function can be realized with a small number of components using the wakeup voltage generator in the air conditioner.

The outdoor unit may include an outdoor unit controller and a connector connected between the communication line and the outdoor unit controller, wherein a signal output from the wakeup voltage generator is delivered to the outdoor unit controller through the connector.

Those skilled in the art will appreciate that embodiments may be carried out in other specific ways than those set forth herein without departing from the spirit and essential characteristics. The above embodiments are therefore to be construed in all aspects as illustrative and not restrictive. The scope of embodiments should be determined by the appended claims and their legal equivalents, not by the above description, and all changes coming within the meaning and equivalency range of the appended claims are intended to be embraced therein.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply apparatus having a power saving function, comprising:
    a first power supply device to couple to an AC power supply; a first communication circuit to couple to the first power supply device and to a communication line;
    a connector to couple to the first communication circuit and the communication line;
    a first controller to couple to the first communication circuit and the connector, wherein the connector is controlled by the first controller:
    a second communication circuit to couple to the communication line and to the AC power supply;
    a second power supply device to couple to the AC power supply; a wakeup voltage generator to couple to the communication line and the second power supply device to provide a voltage; and
    a second controller to couple to the second communication circuit and the wakeup voltage generator, wherein the wakeup voltage generator includes:
    a pulse transformer connected to the second power supply device to provide a pulse signal; and
    a switch device to couple to the pulse transformer, and to be driven by the second controller which is separate from the first controller through the communication line, and
    wherein the pulse transformer transmits the pulse signal when the switch device is turned on by control of the second controller, and
    wherein a secondary side of the pulse transformer is coupled to the first communication circuit and the connector through the communication line.

2. The power supply apparatus according to claim 1, wherein when a power saving state is released, the wakeup voltage generator provides a pulse wave signal to the first controller through the communication line.

3. The power supply apparatus according to claim 1, wherein when a power saving state is released, the second controller applies a pulse signal to the wakeup voltage generator to control the wakeup voltage generator to provide a pulse wave wakeup signal.

4. The power supply apparatus according to claim 1, wherein a primary side of the pulse transformer is coupled to the second power supply device and the secondary side of the pulse transformer is coupled to the communication line.

5. The power supply apparatus according to claim 4, wherein
the switch device is coupled between the primary side of the pulse transformer and a ground of the second power supply device.

6. The power supply apparatus according to claim 1, wherein a signal output from the wakeup voltage generator is provided to the first controller through the connector.

7. The power supply apparatus according to claim 1, further comprising a relay for selectively coupling a power conversion device for driving a motor and the AC power supply.

8. The power supply apparatus according to claim 1, wherein the connector includes a photocoupler controlled by the first controller.

9. An air conditioner comprising an indoor unit and an outdoor unit to couple to each other through a communication line,
wherein the outdoor unit comprises:
a first power supply device to couple to an AC power supply;
a first communication circuit to couple to the first power supply device and to the communication line; a connector to couple to the first communication circuit and the communication line; and a first controller to couple to the first communication circuit and the connector, wherein the connector is controlled by the first controller, and wherein the indoor unit comprises:
a second communication circuit to couple to the communication line and to the AC power supply; a second power supply device to couple to the AC power supply; a wakeup voltage generator to couple to the communication line and the second power supply device to provide a voltage; and a second controller to couple to the second communication circuit and the wakeup voltage generator,
wherein the wakeup voltage generator includes:
a pulse transformer to couple to the second power supply device to provide a pulse signal;
and a switch device to couple to one side of the pulse transformer, and to be driven by the second controller which is separate from the first controller through the communication line, and wherein the pulse transformer transmits the pulse signal when the switch device is turned on by control of the second controller, and
wherein a secondary side of the pulse transformer is coupled to the first communication circuit and the connector through the communication line.

10. The air conditioner according to claim 9, wherein when a power saving state is released, the wakeup voltage generator provides a pulse wave signal to the first controller through the communication line.

11. The air conditioner according to claim 9, wherein when a power saving state is released, the second controller provides a pulse signal to the wakeup voltage generator to control the wakeup voltage generator to provide a pulse wave wakeup signal.

12. The air conditioner according to claim 9, wherein a primary side of the pulse transformer is coupled to the second power supply device and the secondary side of the pulse transformer is coupled to the communication line.

13. The air conditioner according to claim 12, wherein the switch device is coupled between the primary side of the pulse transformer and a ground of the second power supply device.

14. The air conditioner according to claim 9, wherein a signal output from the wakeup voltage generator is provided to the first controller through the connector.

15. The air conditioner according to claim 9, wherein the connector includes a photocoupler controlled by the first controller.

16. An air conditioner comprising an indoor unit and an outdoor unit to couple to each other through a communication line, wherein the indoor unit comprises:
a communication circuit to couple to the communication line and to an AC power supply; a power supply device to couple to the AC power supply; a wakeup voltage generator to couple to the communication line and the power supply device to provide a voltage; and
an indoor unit controller to couple to the communication circuit and the wakeup voltage generator, wherein when a power saving state is released, the indoor unit controller provides a signal to the wakeup voltage generator to provide a pulse wave wakeup signal to the outdoor unit through the communication line, wherein the wakeup voltage generator includes:
a pulse transformer to couple to the power supply device to provide a pulse signal; and
a switch device to couple to one side of the pulse transformer, and to be driven by the indoor unit controller, and
wherein the pulse transformer transmits the pulse signal when the switch device is turned wherein a primary side of the pulse transformer is coupled to the power supply device and a secondary side of the pulse transformer is coupled to the communication line, and wherein the switch device is coupled between the primary side of the pulse transformer and a ground of the power supply device.

17. The air conditioner according to claim 16, wherein the outdoor unit comprises an outdoor unit controller and a connector coupled between the communication line and the outdoor unit controller,
wherein a signal output from the wakeup voltage generator is provided to the outdoor unit controller through the connector.

* * * * *